Figure 4:
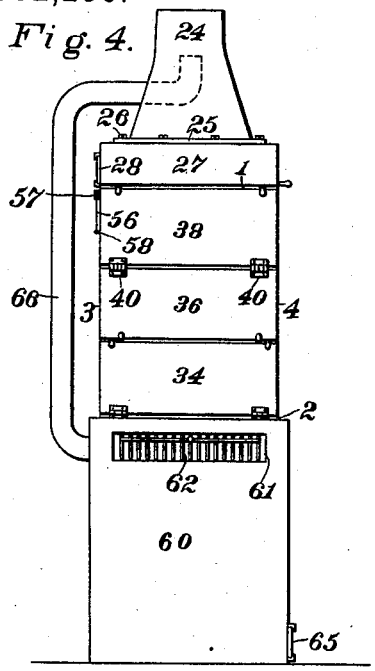

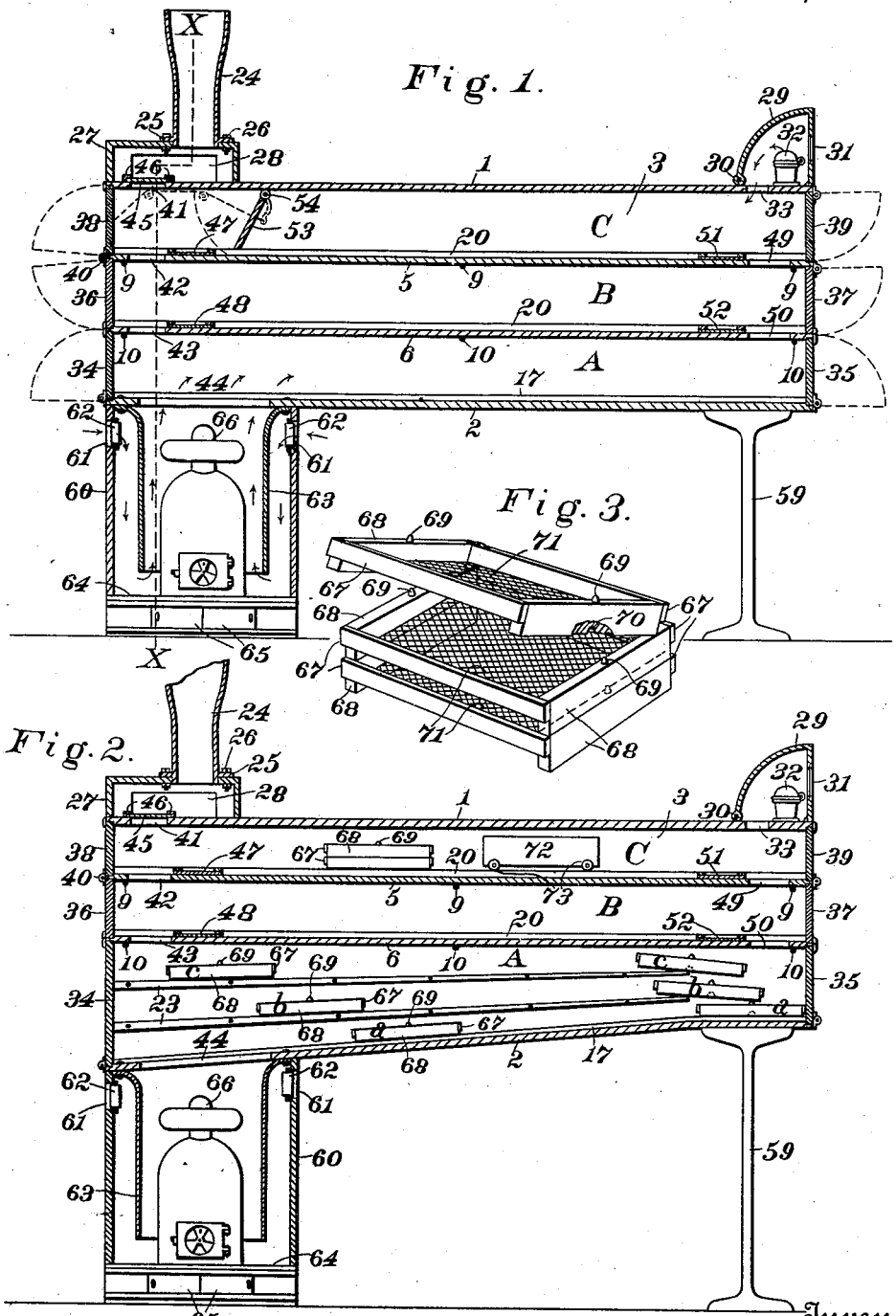

(No Model.) 3 Sheets—Sheet 2.

B. L. RYDER.
FRUIT DRIER.

No. 592,256. Patented Oct. 26, 1897.

Witnesses
William B. Thomas
R. Clinton Ballinger

Inventor
Benjamin L. Ryder
By Edwin Guthrie
Attorney (No Model.) 3 Sheets—Sheet 3.

B. L. RYDER.
FRUIT DRIER.

No. 592,256. Patented Oct. 26, 1897.

Witnesses
William B. Thomas
R. Clinton Balinger

Inventor
Benjamin L. Ryder
By Edwin Guthrie
Attorney

UNITED STATES PATENT OFFICE.

BENJAMIN L. RYDER, OF CHAMBERSBURG, PENNSYLVANIA.

FRUIT-DRIER.

SPECIFICATION forming part of Letters Patent No. 592,256, dated October 26, 1897.

Application filed October 24, 1896. Serial No. 609,974. (No model.)

*To all whom it may concern:*

Be it known that I, BENJAMIN L. RYDER, a citizen of the United States, residing at Chambersburg, in the county of Franklin and State of Pennsylvania, have invented certain new and useful Improvements in Fruit-Driers; and I do declare the following to be a full, clear, and exact description of the invention, such as will enable others skilled in the art to which it appertains to make and use the same, reference being had to the accompanying drawings, and to the figures and letters of reference marked thereon, which form a part of this specification.

My invention relates to fruit driers or evaporators, more particularly to the class of apparatus including devices such as that described in my United States Letters Patent No. 320,399, dated June 16, 1885, by means of which fruits, vegetables, cereals, seed, herbs, and animal-food products are subjected to preservative desiccation.

My invention has for its object the improvement of the constructions set out in the patent aforesaid and others heretofore granted to me and to produce a drier capable of carrying out conveniently, rapidly, and cheaply a number of known processes in the art of preparing edible substances by evaporation to resist decay.

My present improved drier consists of the conventional chambers, usually three, arranged one above the other horizontally, the bottom of the lower chamber being inclined in one form of the invention. In combination with the chambers are suitably-hung doors, affording ingress and egress at each end of every chamber, and sliding dampers or valves enable the heated air as it rises to be directed through the chambers in accordance with the particular amount or character of drying to be accomplished.

My invention comprises, further, a new and especially accessible hinged hood wherein is to be placed the urn or brazier containing the bleaching or color-setting chemical in a state of fusion. A preferred construction of furnace is also shown herein, as well as an improved plan of building the customary trays, with means for grouping them automatically.

Not the least important object of my invention is to produce a drying apparatus wherein the flow of heated air may be so accelerated, retarded, deflected, or combined with external air and its temperature controlled that any skilful operator familiar with the manipulation of mechanical driers in "sweating," "developing and preserving flavor or aroma" in tea, coffee, &c., and "arresting fermentation" in the more common substances may have adequate apparatus offering unlimited opportunity for the determination of the best possible treatment, individually considered, throughout a wide selection of natural products, while less-experienced users may devote the entire structure to the simpler operations with which they are conversant.

Each constituent element of my invention is described in detail, and its office, together with the mode of operation of the whole, fully explained hereinafter.

Figure 5:
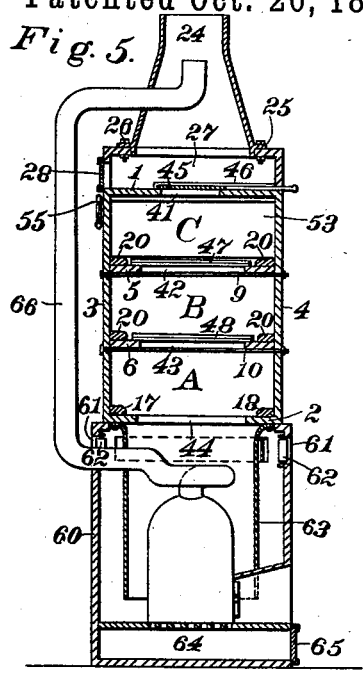
Figure 6:
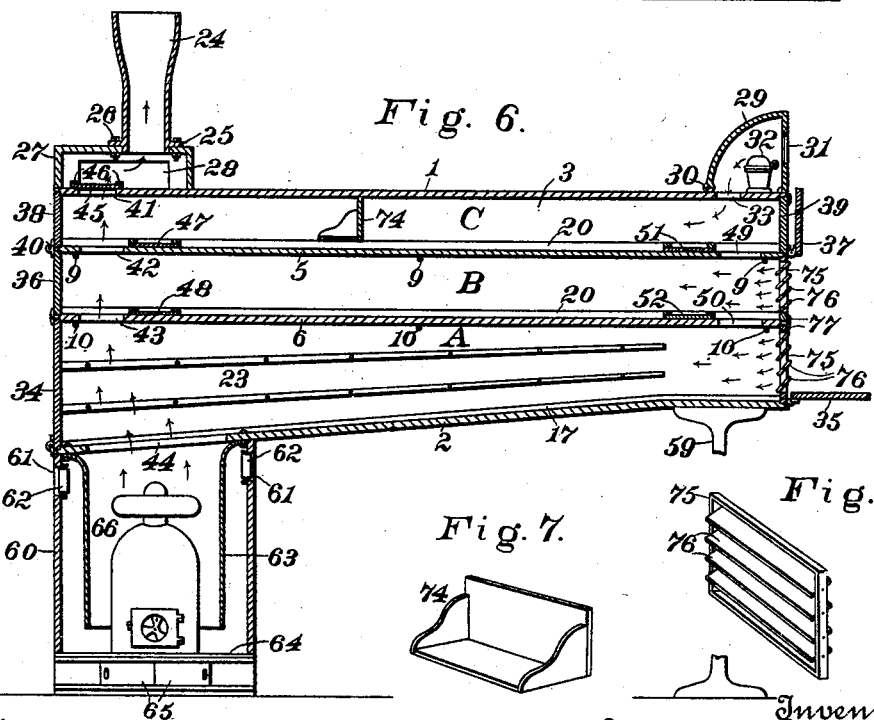
Figure 7:
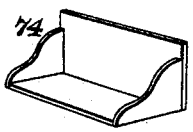
Figure 8:
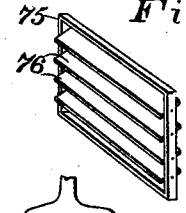
Figure 10:
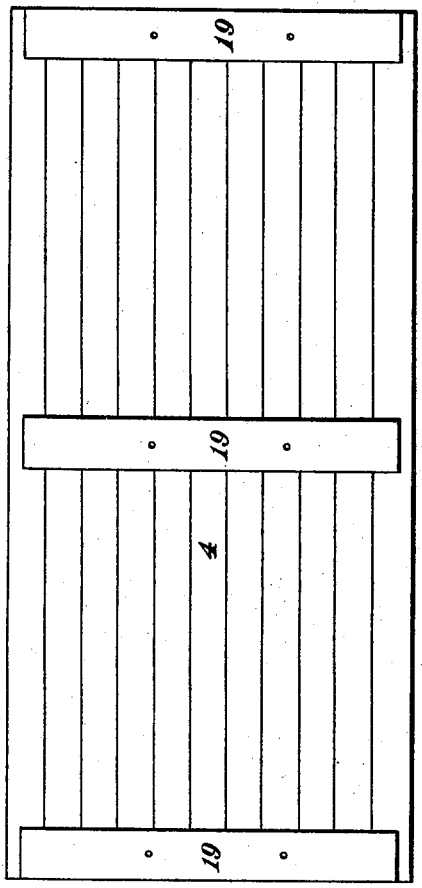
Figure 9:
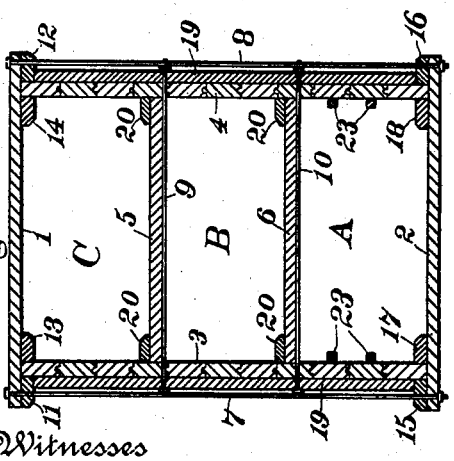
Figure 11:
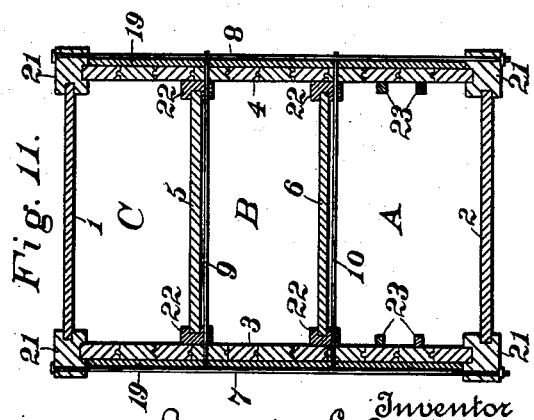

Referring to the accompanying drawings, wherein like numbers are employed to designate like parts throughout the several views, Figure 1 represents a vertical longitudinal mid-sectional view of my invention. Fig. 2 represents a vertical longitudinal mid-sectional view of a modified form of the invention. Fig. 3 represents a perspective detail view showing the plan adopted for constructing the trays, with the means for retaining them in position when grouped. Fig. 4 represents an end elevation from the left of my invention placed as in the first figure. Fig 5 represents a vertical cross-section taken upon the plane indicated by line X X in the first figure. Fig. 6 represents a vertical longitudinal mid-sectional view of the modification, showing the sliding cut-off and substitute doors in position, Fig. 7 showing the sliding cut-off or partition for use in the upper bleaching-chamber and Fig. 8 the substitute doors having adjustable pivoted slats. Both cut-off and substitute doors are employed at will either in connection with the modification or with my invention as shown in the first figure. Fig. 9 represents a cross-section setting out the details of one plan of constructing and combining the walls of the drier, Fig. 10 showing a view lengthwise of one side wall. Fig. 11 represents a cross-section setting out the details of a modified plan of constructing and combining the walls of the chambers, and Fig. 12 shows an interior lengthwise view of one side wall.

Considering Figs. 1, 2, 4, 5, 6, 9, and 11, numeral 1 designates the top, 2 the bottom, and 3 and 4 the sides, of an oblong and customarily rectangular box, forming the body of my invention, which is divided interiorly into an upper, a middle, and a lower chamber by horizontal partitions or floors 5 6. Frequent mention being made of these chambers as such, I have indicated them for purposes of this description by the letters A for the lower, B the middle, and C the upper chamber. Most conveniently available for building the walls of the box are matched boards (tongue-and-groove, see Figs. 9, 10, 11, and 12,) wherein also appear the vertical clamping-rods 7 8 and the horizontal clamping-rods 9 10. As ordinarily built, the top and bottom extend laterally beyond the sides. (See particularly Fig. 9.) Top 1 has attached to its under surface the edge strips or rails 11 12, placed longitudinally, and inner strips 13 14, also fixed lengthwise and parallel with strips 11 12, leaving an interval between outer and inner strips. Bottom 2 possesses similar outer strips 15 16 upon its upper surface, together with inner strips 17 18, and corresponding longitudinal recesses. Side 4, being a duplicate of side 3, is shown in Fig. 10 to be strengthened by cross-pieces or cleats 19, effectively secured to the tongue-and-groove stuff, and each cleat ending at a distance from the edge of the side approximately equal to the depth of the longitudinal recesses formed by the strips upon top and bottom, as described. Into the recesses the edges of the sides are fitted, and the vertical clamping-screws 7 8 are passed through alined orifices in outer strips, top and bottom. Of common design, provided with a head, a threaded end and nut, the rods call for no special description. Horizontal clamping-rods 9 10 pass beneath the floors 5 6 to avoid interference with the passage of the trays, as explained hereinafter. Floors 5 6 are usually placed upon and supported by horizontal rods 9 10, in order that they may be easily removed, and upon the upper surface of each floor, placed against the sides and extending longitudinally, are attached the rails 20 20, all sensibly alike. It is upon these rails that the groups of trays are set and moved.

Figure 12:
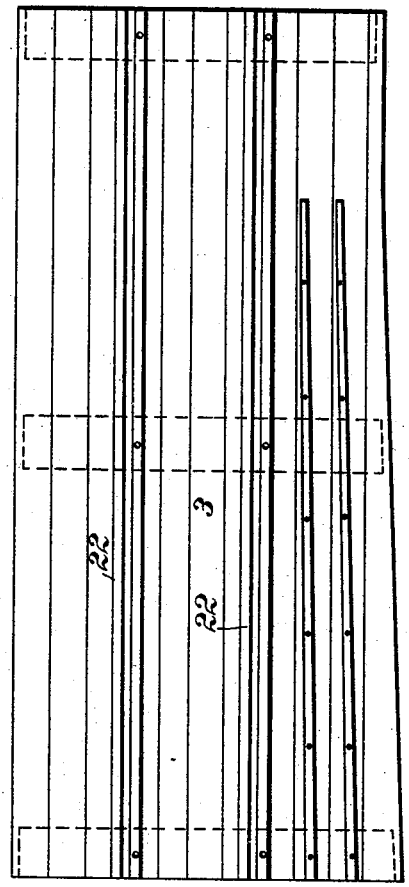

Considering Figs. 11 and 12, a modified plan of construction will be understood. According to this method longitudinal grooves are cut in adjacent sides of rectangular corner-beams 21 21, and in such grooves the top, bottom, and sides are removably inserted. Exteriorly the beams 21 project laterally beyond the sides 3 4, and the vertical clamping-rods pass through these projecting portions. To support floors 5 6, grooved strips 22 22 are fixed lengthwise on the inner surfaces of the sides (see Fig. 12) and the floors are secured within the grooves. In this modified construction the upper edges of strips 22 22 perform the same office as tray-carrying rails 20. In chamber or compartment A (see Figs. 9, 10, and 12) appear the local or sideboard rails 23 23, also tray-carriers, which will be again mentioned. Local rails 23 are customarily strips having convergent edges. They are screwed lengthwise of the sides, the intervals between them being greatest at the front or heater end of the chamber and least at the rear.

I do not confine myself to any special structure, nor do I limit myself to wood as the sole material to be used. Indeed in certain special cases the floors are most advantageously constructed of sheet metal, plain or corrugated.

Considering Figs. 1, 2, and 6, number 24 marks the stack, of any height, having a flange or collar 25, through which pass bolts 26, whereby the stack is fixed upon a soot-box 27. A door 28 affords means of cleaning the box. It will be noted that soot falling from the stack settles upon the bottom of the box and not upon the damper shown in the three figures, an important feature of my invention, as otherwise fine particles of soot might in falling be distributed over the contents of the trays. In Figs. 1, 2, and 6 also appears the hinged hood 29, consisting of a curving top and back with perpendicular front and sides. 30 marks the hinge or one of several hinges, and by removing the pins of these hinges the hood can be wholly detached for transportation or storage. Through the upright front is an opening 31, glazed by a glass or mica plate, and seated upon top 1 within the hood rests the brazier 32, lined with fire-clay or otherwise prepared to contain flowers of sulfur ignited. Brazier 32, with its charge of burning bleaching chemical, may be removed from hood 29 and placed in any other part of the apparatus or upon the heater hereinafter described.

It is essential only that the fumes should thoroughly permeate either or all of the chambers A B C that may be employed in bleaching during any particular operation. Through top 1, under the hood 29, a transverse opening or slot is made, which is numbered 33. Opening 33 permits the heavy fumes of the burning sulfur to enter the body of the drier, while the hood guards the opening against external air.

It will be noted (see Figs. 1, 2, and 6) that each of chambers A B C possesses two doors, one at each end. The doors of chamber A are numbered 34 35, left and right; those of chamber B 36 37, and those of chamber C 38 39. As a matter of convenience doors 36 38 open upon a common hinge 40, but such device is not essential, nor do I confine myself to the exact manner in which the terminal doors are represented as opening. At the left and situated near the doors is a transverse opening through top 1, (marked 41.) A like opening through floor 5 is marked 42, another through floor 6 is marked 43, and one through bottom 2 is marked 44. Opening 41 is closed upon the upper surface of top 1 by damper 45, arranged to slide within guides 46 46. Opening 42 is closed on the upper surface of floor 5 by damper 47, sliding laterally upon the floor between rails 20. Opening 43 through floor 6 is closed on the upper side by damper 48, sliding upon the floor. While the sliding dampers, consisting of a flat board or metal sheet having cleats secured along the side edges and operated by hand through the doors, as shown herein, are preferred as being the simplest, any known devices for accomplishing the purpose might be substituted. At the right are openings of substantially similar form to those located at the left of my invention. Opening through floor 5 is designated by number 49; that through floor 6 by number 50. Damper 51 may be reciprocated on the floor above opening 49, and damper 52 closes opening 50.

Operating within chamber C at the left will be noted the swinging partition 53, pivoted upon a suitably-supported rod or shaft 54. Outside of the body of my invention the rod 54 terminates in a crank 55. (Shown in Fig. 5, but omitted in Fig. 4.) In the latter figure appears cord 56, one end of which connects with the outer end of crank 55, and the cord is then led over small pulleys 57, the remaining extremity being tied to a screw-eye 58 in the edge of door 38. Clearly when door 38 is opened partition 53 will be raised by means of cord and crank. The office of partition 53 is to close chamber C from the draft of the stack when that chamber is being employed for bleaching and the remaining chambers are at the same time employed in drying operations. By drawing upon the cord and fastening it to eye 58 the partition may be held in its raised position for any length of time.

A suitable column 59 supports the body of my invention at one end, although any form of support, including brick or stone work, could be used. At the other end the body rests upon the casing 60 of the heater. Near the top of the casing are provided inlet-apertures 61, which can be closed by registers or hinged flaps 62, of well-known form and operation. Next within the casing is met the cylindrical apron 63, which is bolted in close circular contact with bottom 2 and extends downwardly to within a short distance of the top of ash-box 64. The ash-box is provided with suitable draft-regulating doors 65, and into the box, through a common grate, the heater opens. To carry off the products of combustion, the pipe 66 is provided and is led into stack 24, (see Figs. 4 and 5,) where its buoyant contents are delivered and aid the drying air to pass through and over the trays. Usually pipe 66 is given one or more turns within the apron to increase the heating-surface, care being taken that no leak exists from pipe 66 or heater into the hot-air channels. By thus first directing the cold air downwardly between casing and apron a great deal of the heat otherwise radiated and lost is saved and rendered useful and a greater volume of heated air constant in temperature obtained. I do not limit myself to this or any particular form of heater, but may employ a stove or steam-heater where available, inclosing the same in brick or masonry.

Considering Fig. 3, the construction of the trays forming a part of my invention will be understood. They are composed of comparatively narrow side pieces 67, wider end pieces 68, having the pins 69 upon the upper edges placed at the middle point of each end piece. Pin-holes 70 in the lower edges of the end pieces are properly formed and situated for the reception of the pins of another tray. 71 marks the woven-wire-fabric bottom of one tray, and all are similarly closed at the bottom, in order that the bleaching-fumes and subsequently the drying-air may surround each piece of fruit.

In chamber C, Fig. 2, beside the group of two trays there is shown a truck or crib 72, movable upon rollers 73 73, which is sometimes used for bleaching or setting the color of fruits or for wilting herbs and tea-leaves and like purposes. Truck 72 is often more convenient for special operations than the regular trays, although the latter could be arranged to act as well. Rollers 73 rest upon rails 20 in common with the trays, but the truck is more easily moved when heavily loaded than a correspondingly-laden group of trays.

Considering the modification shown in Fig. 6, number 74 designates a movable cut-off or partition, more clearly presented in Fig. 7, and intended to be moved along the rails in chamber C in front of the trays or bleaching-truck. The office of cut-off 74 is to reduce the size of the chamber in small bleaching operations and to retard the escape of the bleaching-fumes. It consists, usually, of two boards fixed together at right angles, with side pieces acting as braces, and may be entered at door 39 and removed through door 38. There also appears in Fig. 6, and more clearly in Fig. 8, a representation of one of my ventilating or substitute doors. Each consists of a rectangular frame 75, surrounding and supporting pivoted slats 76. The pivots of each slat may be formed to fit more or less tightly, causing sufficient friction to permit them to be adjustably opened or closed. Frames 75 are constructed to occupy the apertures normally closed by doors 35 37, and any convenient device may be used to retain the frames within the apertures, such as the buttons 77, which fasten the doors. As substitute doors I could employ perforated boards, and I do not, therefore, confine myself to the construction detailed herein.

Various processes may be carried out by competent operators with the aid of my present invention. In setting the color of fruits it has been found that heat is often needed in addition to energize the bleaching or germicidal properties of the sulfur fumes. Floor 5, being made of metal, this heat is readily supplied from below both by radiation and convection. This reception of heat takes place also, though in a lesser degree, when the floor is of wood, as described. By closing the inlet-apertures 61 and proceeding with a small fire all the chambers may be devoted to bleaching in considerable operations. After confining the heat and sulfur fumes to the chamber or chambers wherein are trays of freshly-cut fruit, &c., for perhaps an hour, I begin drying by filling a few trays and placing them over or back of the heater in chamber A (see Fig. 2) through door 34. Trays may be removed by door 35 and placed in chamber B by either of its doors being pushed forward, singly or grouped, one after another. It is occasionally necessary to carry some of the trays or their contents over a second time through the drying-chambers, "doubling" or placing the fruit from two or more trays upon one, and I frequently utilize chamber C as a finishing or maturing chamber for fruits not sufficiently cured to pack. In ordinary operations dampers 48 51 are caused to close the apertures 43 49, dampers 45 47 52 being withdrawn. I may dispense with damper 45 entirely in certain instances. In preparing barks and spices I have found that a moderate temperature of air through the several chambers is most efficient, and I therefore withdraw dampers 45 48 51 52, raise swinging partition 53 by the cord, and permit the heated air to pass from front to rear of both chambers A B upward and forward through chamber C to the stack.

Fig. 2 illustrates a form of my invention which I have found to be particularly effective in drying cut sweet corn, grated cocoanut, and substances of like nature that cannot practically be spread thin enough upon the trays to permit the air-passage through the material. The trays are placed in series upon bottom rails 17 18 and upon local rails 23 23, one tray acting to push forward that or those ahead of it. Each series of trays is thus separated from the others by a sufficient space for the passage of hot-air currents, which refuse to pass between layers or masses of wet green material when too closely superimposed. The efficiency of the invention is further improved by increasing the depth of chamber A near the heater with corresponding separation of the rails. As the series of trays resting upon the bottom rails 17 18 is complete the end of one tray will nearly touch door 35. It will be noted here (see Figs. 2 and 6) that local rails 23 terminate before reaching that door, leaving an interval slightly greater than the common width of the trays. The first trays are placed upon rails 17 18 23 in order shown in Fig. 2, chamber A, (marked $a$ $b$ $c$,) and others introduced behind them. Tray $a$, leading the lower series, must therefore reach the rear first. As the end tray $b$ of the series next from the bottom reaches the termination of its local rails, or the point from which upper and lower local rails diverge toward the door at the heater end of the body, its forward end drops and its inner end rises against the upper local rails. If tray $b$ is continually pushed forward by the trays in rear, its outer lower corner finally drops upon the end tray of the lowest series. Further movement causes it to leave its local rails and fall upon the bottom tray, the pins of the latter entering the pin-holes of the former, as already explained.

It will be understood that the progress of tray $b$, as described, is precisely that of tray $c$ in its turn; but a minimum of skill and attention is called for to group the trays in the manner just set out.

It is clearly within the scope of my invention to further enlarge or expand chamber A and add other local rails, if required.

The modification (see Fig. 6) contemplates the employment of the slatted or substitute doors (see Fig. 8) in "air-drying" herbs, seed, &c.

It will be readily seen that by permitting the heated air to ascend directly into the stack outside air will flow through the substitute doors and the heat of the chambers can be tempered at will for special uses.

It is unnecessary to detail here each and all operations which are known or might be suggested to persons habitually following the art to which my invention relates, as the manner of using my invention can be varied almost without limit to suit any circumstances or weather conditions.

What I claim, and desire to protect by Letters Patent of the United States, is—

1. In a fruit-drier, the combination of an air-heating device consisting of a heater and a hot-air compartment, a suitably-supported box or body in communication with said hot-air compartment, said box being divided into chambers by horizontal floors, each of said chambers having doors at its ends, each of said floors having apertures and dampers near its ends, a stack in communication with the upper chamber of said box, rails secured to the side walls of the lowest chamber of said box, said rails beginning at one end opening of said chamber and terminating within the said chamber, substantially as described.

2. In a fruit-drier, the combination of an air-heating device consisting of a heater and a hot-air compartment, means for regulating the hot-air supply, a suitably-supported box or body in communication with said hot-air compartment, said box being divided into chambers by horizontal floors, each of said chambers having doors at its ends, each of said floors having apertures and dampers near its ends, a stack in communication with the upper chamber of said box, the lowest chamber having an inclined bottom, rails secured to the side walls of said lowest chamber, said rails beginning at the greater end opening of said chamber, converging toward each other and terminating within said chamber, substantially as described.

3. In a fruit-drier, the combination of an air-heating device consisting of a heater and a hot-air compartment, a box or body in communication with said hot-air compartment, one end of said box being supported by the air-heating device, means for supporting the remaining end of the box, said box being divided into chambers by horizontal floors, each of said chambers having doors at its ends, each of said floors having apertures and dampers near its ends, a stack opening into the upper chamber of said box, said upper chamber provided with an adjustable partition, said box having an opening through the top, a hood, said hood being pivotally secured over said box-top opening, a suitable brazier, rails secured to the floors of said chambers, rails secured to the side boards of the lowest of said chambers, said side-board rails beginning at the door of said lowest chamber nearest the air-heating device and terminating within said chamber, substantially as described.

4. In a fruit-drier, the combination of an air-heating device consisting of a heater and a hot-air compartment, a box or body in communication with said hot-air compartment, one end of said box being supported by the air-heating device, means for supporting the remaining end of the box, said box being divided into chambers by horizontal floors, each of said chambers having doors at its ends, each of said floors having apertures and dampers near its ends, a stack opening into the upper chamber of said box, said upper chamber provided with an adjustable partition, the floor of said upper chamber being constructed of metal, said box having an opening through the top, a hood, said hood being pivotally secured over said box-top opening, a suitable brazier, rails secured to the floors of said chambers, rails secured to the side boards of the lowest of said chambers, said side-board rails beginning at the door of said lowest chamber nearest the air-heating device and terminating within said chamber, substantially as described.

In testimony whereof I affix my signature in presence of two witnesses.

BENJAMIN L. RYDER.

Witnesses:
   VAN T. HAULMAN,
   F. D. DITSBAR.